(12) United States Patent
Choi

(10) Patent No.: US 11,458,944 B2
(45) Date of Patent: *Oct. 4, 2022

(54) MASTER CYLINDER OF BRAKE FOR VEHICLE

(71) Applicant: HYUNDAI MOBIS CO., LTD., Seoul (KR)

(72) Inventor: Byeoung Jin Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 126 days.

This patent is subject to a terminal disclaimer.

(21) Appl. No.: 16/899,289

(22) Filed: Jun. 11, 2020

(65) Prior Publication Data

US 2020/0391718 A1    Dec. 17, 2020

(30) Foreign Application Priority Data

Jun. 12, 2019   (KR) ........................ 10-2019-0069352

(51) Int. Cl.
  *B60T 13/74*    (2006.01)
  *B60T 13/16*    (2006.01)
  *B60T 17/04*    (2006.01)

(52) U.S. Cl.
  CPC .......... *B60T 13/745* (2013.01); *B60T 13/161* (2013.01); *B60T 17/04* (2013.01)

(58) Field of Classification Search
  CPC ...... B60T 13/745; B60T 13/741; B60T 13/74; B60T 8/4018; B60T 8/4022; F16H 25/2015; F16H 2025/204; F16H 2025/2075; F16H 2025/2078
  See application file for complete search history.

(56) References Cited

U.S. PATENT DOCUMENTS

| | | | | |
|---|---|---|---|---|
| 5,302,008 A | * | 4/1994 | Miyake | B60T 8/4072 303/14 |
| 5,348,123 A | * | 9/1994 | Takahashi | B60T 7/04 188/72.1 |
| 5,667,283 A | * | 9/1997 | Drennen | F16H 25/186 74/567 |

(Continued)

FOREIGN PATENT DOCUMENTS

| | | | | |
|---|---|---|---|---|
| DE | 19513349 A1 | * | 10/1996 | ............ B60T 13/745 |
| DE | 102011080914 A1 | * | 2/2013 | ............ B60T 13/745 |

(Continued)

*Primary Examiner* — Robert A. Siconolfi
*Assistant Examiner* — Stephen M Bowes
(74) *Attorney, Agent, or Firm* — Morgan, Lewis & Bockius LLP

(57)  ABSTRACT

A master cylinder of a brake for a vehicle includes: a housing that is provided with ports through which oil flows; a motor that is connected to the housing and supplies rotation power; a screw that is rotatably installed inside the motor and is supplied and rotated with the rotation power of the motor; a movable piston that is engaged with an outside of the screw and is moved in a longitudinal direction of the housing by the rotation of the screw; a guide that is caught on the housing, subjected to restraint of rotation, and installed to be movable in the longitudinal direction of the housing, restrains rotation of the movable piston, and guides linear motion of the movable piston in the longitudinal direction.

9 Claims, 7 Drawing Sheets

(56) References Cited

U.S. PATENT DOCUMENTS

| | | | | |
|---|---|---|---|---|
| 6,230,492 B1* | 5/2001 | Kingston | ............. | B60T 13/745 |
| | | | | 60/545 |
| 10,889,279 B2* | 1/2021 | Choi | ................. | B60T 13/745 |
| 2012/0160043 A1* | 6/2012 | Drumm | ................. | F16H 25/20 |
| | | | | 74/89.23 |
| 2020/0010067 A1* | 1/2020 | Lee | .................. | B60T 13/741 |

FOREIGN PATENT DOCUMENTS

| | | | | |
|---|---|---|---|---|
| DE | 102017211874 A1 * | 1/2019 | ............ | B60T 13/745 |
| FR | 2931772 A1 * | 12/2009 | ............ | B60T 13/741 |
| KR | 10-2016-0095486 A | 8/2016 | | |
| WO | WO-8903783 A1 * | 5/1989 | ............ | B60T 13/745 |

\* cited by examiner

MASTER CYLINDER OF BRAKE FOR VEHICLE

CROSS-REFERENCE TO RELATED APPLICATION

This application claims priority from and the benefit of Korean Patent Application No. 10-2019-0069352, filed on Jun. 12, 2019, which is hereby incorporated by reference for all purposes as if set forth herein.

BACKGROUND

Field

Exemplary embodiments of the present disclosure relate to a master cylinder of a brake for a vehicle, and more particularly, to a master cylinder of a brake for a vehicle, capable of easily controlling a preload and a tolerance between assembled components through an elastic body to improve operation reliability.

Discussion of the Background

In general, a master cylinder of a brake for a vehicle generates a braking force for restricting movement of wheels using a hydraulic pressure that is generated when pistons inside the master cylinder are moved.

A required braking pressure is determined by a motion of a driver who presses a pedal. Thus, the master cylinder is operated to implement the required braking pressure, and the hydraulic pressure generated from the master cylinder is transferred to each wheel.

Since the master cylinder is operated by the hydraulic pressure so far, there is a difficulty in accurately moving the pistons to implement the braking pressure. To solve this problem, a method of moving pistons using rotation power of a motor has been invented, but because a tolerance between assembled components is not properly controlled, there is a problem in that friction and interference between the components occur. Thus, there is a need to solve this problem.

The background art of the present disclosure is disclosed in Korean Patent Application Laid-Open No. 2016-0095486 (published on Aug. 11, 2016, and entitled MASTER CYLINDER OF BRAKE FOR VEHICLE).

SUMMARY

Various embodiments of the present disclosure were made to solve the above problems, and are directed to providing a master cylinder of a brake for a vehicle, capable of easily controlling a preload and a tolerance between assembled components through an elastic body to improve operation reliability.

In an embodiment, a master cylinder of a brake for a vehicle includes: a housing provided with ports through which oil flows; a motor connected to the housing and configured to supply rotation power; a screw rotatably installed inside the motor and supplied and rotated with the rotation power of the motor; a movable piston engaged with an outside of the screw and moved in a longitudinal direction of the housing by the rotation of the screw; and a guide caught on the housing, subjected to restraint of rotation, installed to be movable in the longitudinal direction of the housing, configured to restrain rotation of the movable piston, and configured to guide linear motion of the movable piston in the longitudinal direction.

In an embodiment, the master cylinder of a brake for a vehicle may further include a ball member connected to a screw rotary shaft of the screw and having a curved surface.

In an embodiment, the screw may include: a screw body rotatably installed inside the motor, having screw threads formed on an outer surface thereof, and connected with the ball member; and the screw rotary shaft extending from the ball member and splined to a rotary frame of the motor.

In an embodiment, the screw body may be rotated about the ball member, and be subjected to axis alignment.

In an embodiment, the master cylinder of a brake for a vehicle may further include supports located on both sides of the ball member and configured to rotatably support the ball member.

In an embodiment, the master cylinder of a brake for a vehicle may further include a pressurizer installed on the housing opposite to the guide and configured to pressurize the guide with an elastic force.

In an embodiment, the pressurizer may be a leaf spring having a curved cross section, and pressurize the guide in a direction away from the movable piston.

In an embodiment, a first support surface of the guide which receives a load due to the pressurizer and a hydraulic pressure inside the housing may have a larger area than a second support surface of the movable piston which receives a load due to a hydraulic pressure inside the housing.

In an embodiment, the guide having the first support surface may always receive a load in a direction away from the movable piston.

In an embodiment, components located in a longitudinal direction of the pressurizer may receive a load in the same direction.

In the master cylinder of a brake for a vehicle according to the present disclosure, since the pressurizer that is an elastic body elastically pressurizes the guide body in a direction in which the supports are installed, and imparts a preload between assembled components, tolerance control can be facilitated, and occurrence of friction and interference between the components can be reduced.

Further, since the guide has a larger area receiving a load than the movable piston, the guide can always receive a load in a direction away from the movable piston, and tolerance control between the components can be facilitated.

Further, since the screw is rotated about the ball member, axis alignment can be facilitated.

BRIEF DESCRIPTION OF THE DRAWINGS

FIG. 2 is a sectional view illustrating a state in which a screw is rotated about a ball member according to an embodiment of the present disclosure and a deviation angle is compensated for.

FIG. 3 is a sectional view illustrating a state in which the screw according to an embodiment of the present disclosure is moved in an up-down direction and eccentricity is compensated for.

DETAILED DESCRIPTION OF THE ILLUSTRATED

Embodiments

Figure 1:
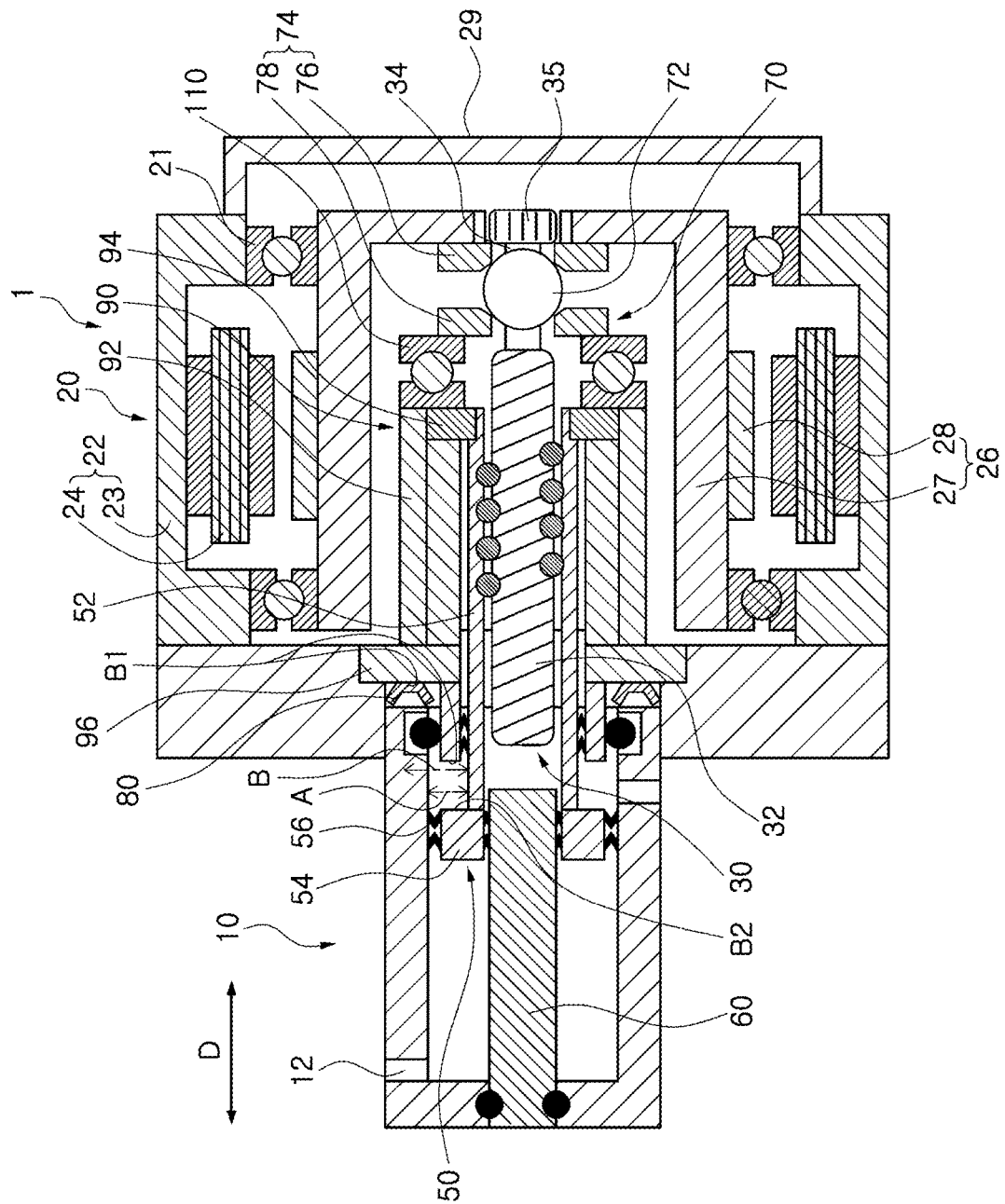
FIG. 1 is a sectional view schematically illustrating a structure of a master cylinder of a brake for a vehicle according to an embodiment of the present disclosure.

Hereinafter, a master cylinder of a brake for a vehicle according to an embodiment of the present disclosure will be described with reference to the accompanying drawings. Thicknesses of lines or sizes of components illustrated in the drawings in the process of describing the master cylinder of a brake for a vehicle may be exaggeratedly illustrated for clarity and convenience of description.

Further, terms, as will be described below, are terms defined in consideration of their functions in the present disclosure, which may be varied according to the intention of a user or an operator or practice. Therefore, the terms should be defined based on the whole contents of this specification.

Figure 2:
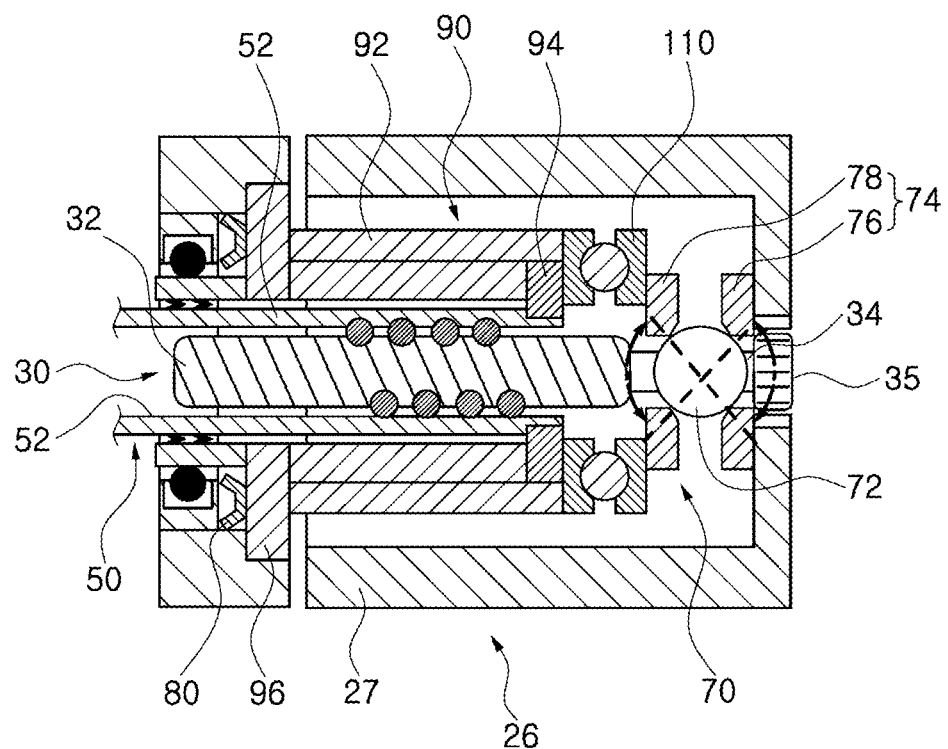
Figure 3:
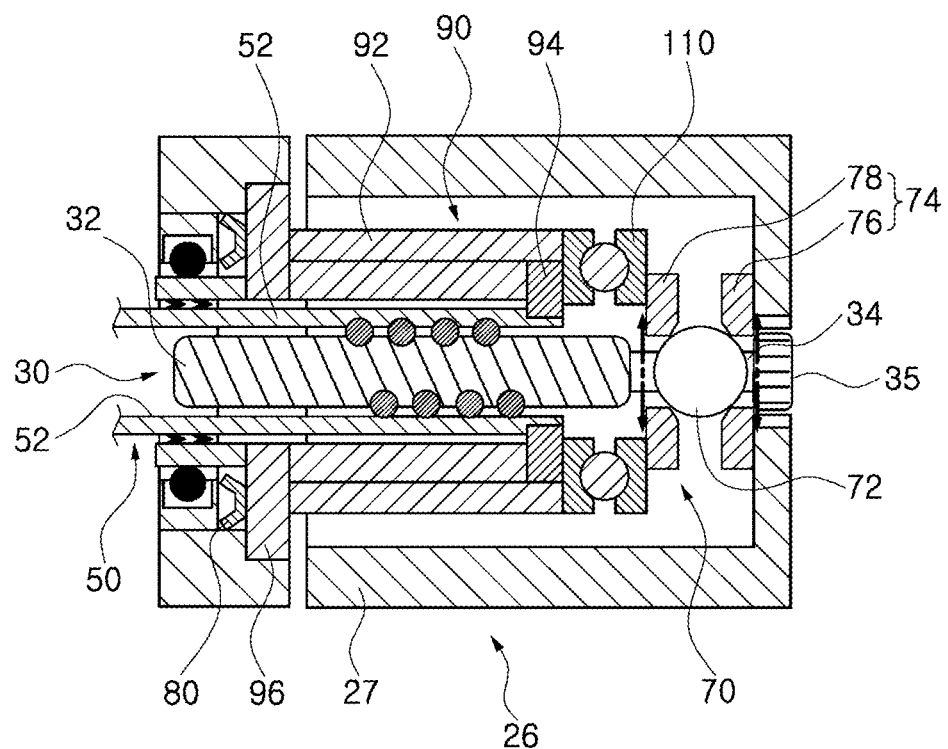
Figure 4:
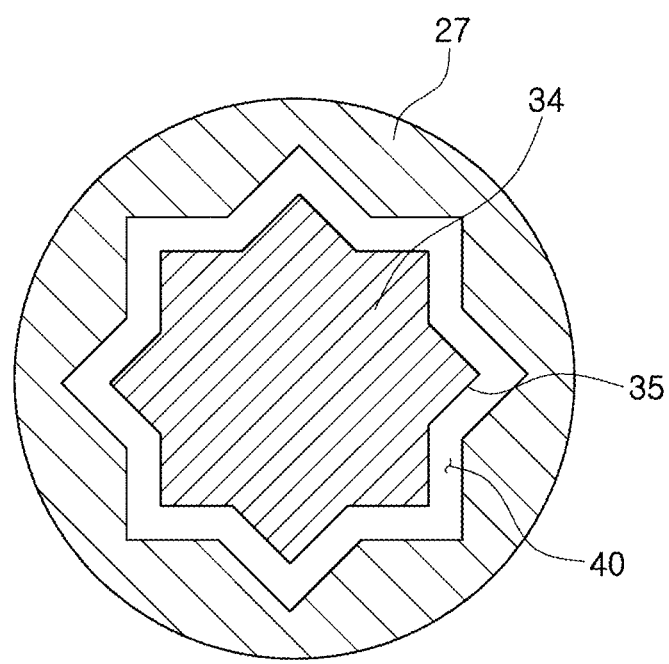
FIG. 4 is a view illustrating a state in which a compensation gap is formed between male splines and a rotary frame according to an embodiment of the present disclosure.
Figure 5:
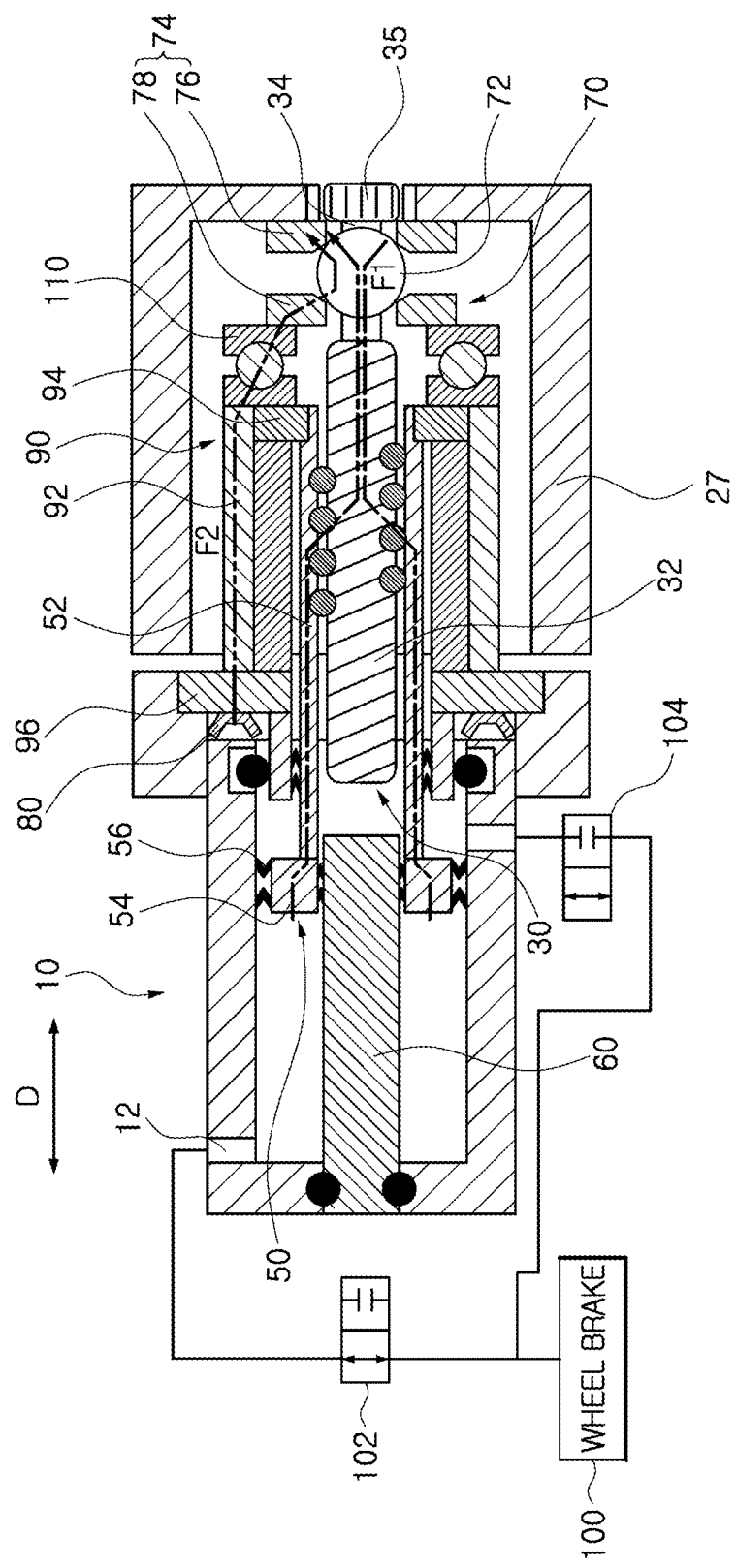
FIG. 5 is a sectional view illustrating a state in which a hydraulic pressure is generated on one side of a piston member according to an embodiment of the present disclosure.
Figure 6:
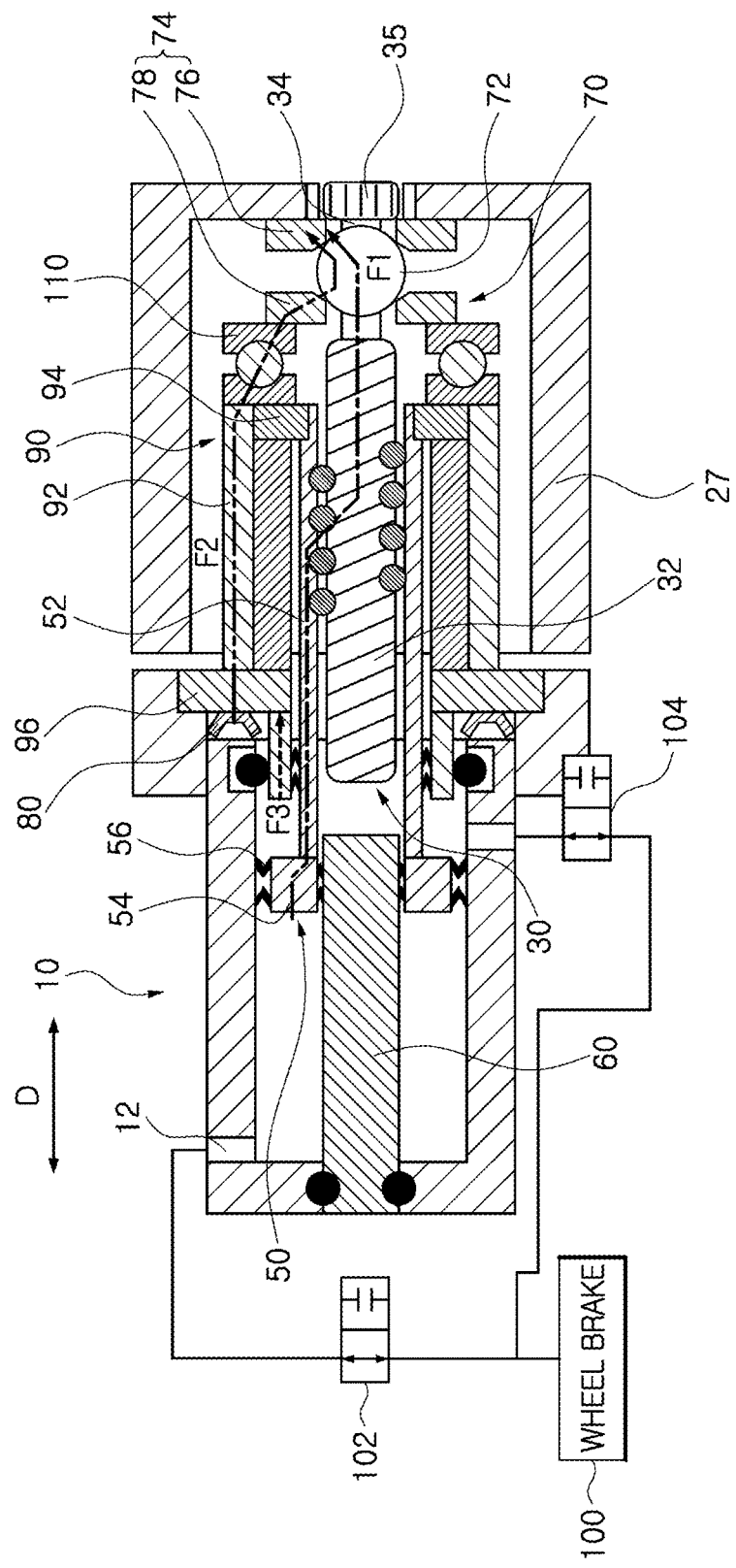
FIG. 6 is a sectional view illustrating a state in which hydraulic pressures are generated on both sides of the piston member according to the embodiment of the present disclosure.
Figure 7:
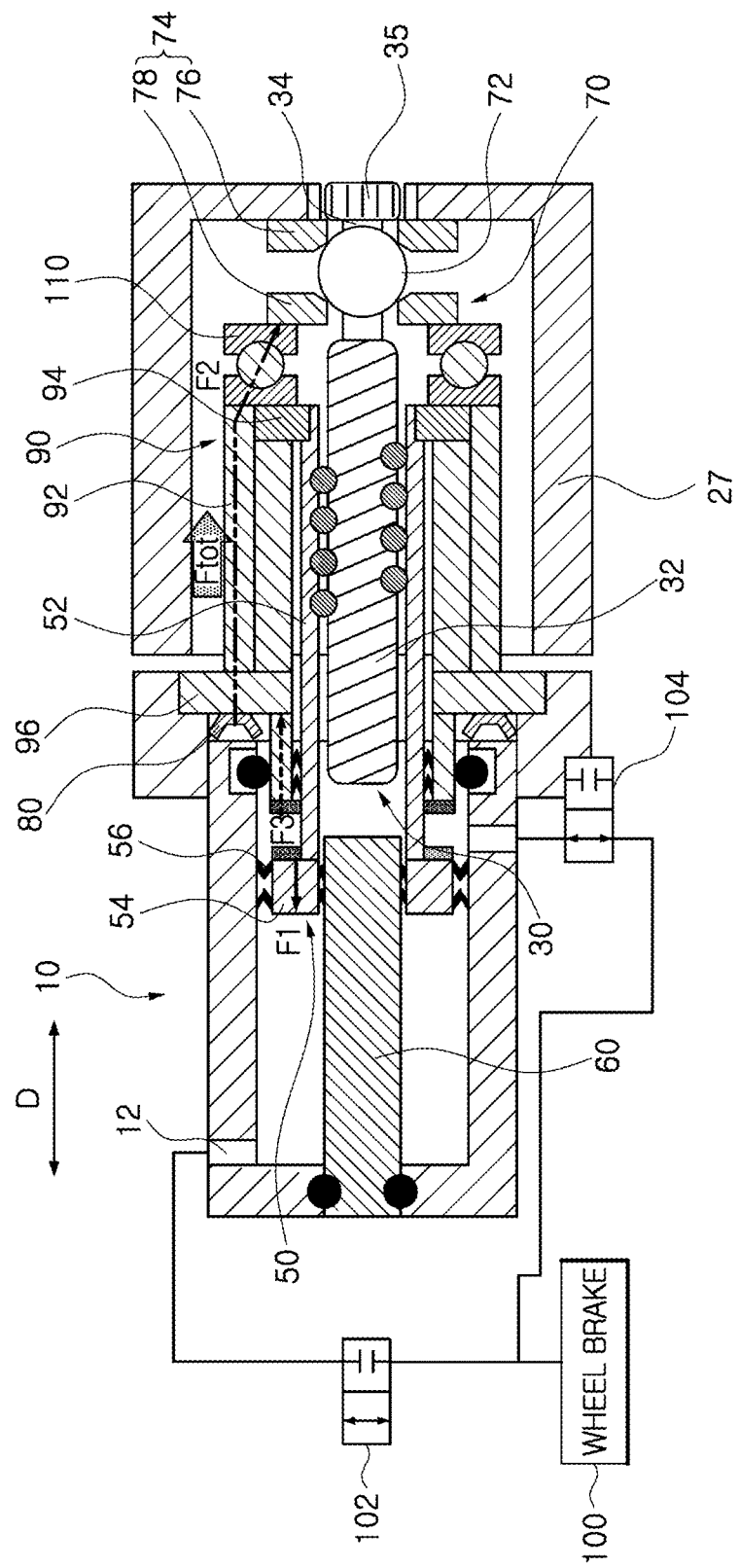
FIG. 7 is a sectional view illustrating a state in which a hydraulic pressure is generated on the other side of the piston member according to the embodiment of the present disclosure.

FIG. 1 is a sectional view schematically illustrating a structure of a master cylinder of a brake for a vehicle according to an embodiment of the present disclosure. FIG. 2 is a sectional view illustrating a state in which a screw is rotated about a ball member according to an embodiment of the present disclosure and a deviation angle is compensated for. FIG. 3 is a sectional view illustrating a state in which the screw according to an embodiment of the present disclosure is moved in an up-down direction and eccentricity is compensated for. FIG. 4 is a view illustrating a state in which a compensation gap is formed between male splines and a rotary frame according to an embodiment of the present disclosure. FIG. 5 is a sectional view illustrating a state in which a hydraulic pressure is generated on one side of a piston member according to an embodiment of the present disclosure. FIG. 6 is a sectional view illustrating a state in which a hydraulic pressure is generated on both sides of the piston member according to the embodiment of the present disclosure. FIG. 7 is a sectional view illustrating a state in which a hydraulic pressure is generated on the other side of the piston member according to the embodiment of the present disclosure.

As illustrated in FIG. 1, a master cylinder 1 of a brake for a vehicle according to an embodiment of the present disclosure includes a housing 10 that is provided with ports 12 through which oil flows, a motor 20 that is connected to the housing 10 and supplies rotation power, a screw 30 that is rotatably installed inside the motor 20 and is supplied and rotated with the rotation power of the motor 20, a movable piston 50 that is engaged with the outside of the screw 30 and is moved in a longitudinal direction D of the housing 10 by the rotation of the screw 30, a guide 90 that is caught on the housing 10, is subjected to restraint of rotation, restrains rotation of the movable piston 50, and guides linear motion of the movable piston 50 in the longitudinal direction D, and a pressurizer 80 that is installed between the housing 10 and the guide 90 and pressurizes the guide 90 with an elastic force.

A required braking pressure is determined by a motion of a driver who presses a pedal of a vehicle. Thus, the master cylinder 1 of a brake for a vehicle is operated to implement the required braking pressure, and a generated hydraulic pressure is transferred to each wheel.

The master cylinder 1 of a brake for a vehicle according to an embodiment of the present disclosure provides a preload control assembly structure among assembled components of the motor 20, the screw 30, the movable piston 50, and the guide 90, and thus can reduce production costs through a reduction in tolerance between assembled components and an improvement in degree of freedom of design. Further, durability, system efficiency and performance can be improved through active axis alignment compensation and wear gap compensation during an operation of the master cylinder 1 of a brake for a vehicle, and noises and vibrations can be reduced.

The ports 12 through which oil flows are provided on both sides of the housing 10 in the longitudinal direction D, and an operation space in which a piston member 54 of the movable piston 50 is moved is provided inside the housing 10. The oil flowing due to the movement of the piston member 54 flows through the ports 12, and implements the required braking pressure.

Various driving units may be used as the motor 20 without departing from the technical spirit that the motor 20 is connected to the housing 10 and supplies rotation power. The motor 20 according to an embodiment includes a motor bearing part 21, a fixing part 22, and a motor rotating part 26.

The fixing part 22 may be formed in various shapes without departing from the technical spirit that the fixing part 22 is fixed to the housing 10 and a magnetic force thereof is changed by supply of electric power. The fixing part 22 according to an embodiment includes a fixing frame 23 that is fixed on one side (the right side of FIG. 1) of the housing 10, and a stator 24 that is installed inside the fixing frame 23 opposite to the motor rotating part 26 and generates a magnetic force.

The fixing frame 23 is connected to one side of the housing 10, and the motor rotating part 26 is rotatably installed inside the fixing frame 23. Further, the stator 24 that is an electromagnet is installed inside the fixing frame 23 in a circumferential direction, and magnetic flux thereof is changed by a control signal of a controller, to rotate the motor rotating part 26.

The motor rotating part 26 may be deformed in various shapes without departing from the technical spirit that the motor rotating part 26 is connected to the screw 30, is rotated along with the screw 30, and is rotated according to a change in the magnetic force of the fixing part 22. The motor rotating part 26 according to an embodiment includes a rotary frame 27 that is rotatably installed inside the fixing frame 23 in a shape in which the rotary frame 27 surrounds an end of the movable piston 50, and a rotor 28 that is installed outside the rotary frame 27 opposite to the fixing part 22 and has a magnetic force.

The motor rotating part 26 according to an embodiment of the present disclosure has a U-shaped cross section, and has a hollow interior. In another embodiment of the present disclosure, the motor rotating part 26 has a solid interior that is subjected to gear connection outside a separate shaft, the rotation of which is restrained by the motor rotating part 26. Thus, in a case where the solid motor rotating part 26 is rotated, the shaft moves the piston member 54 while being linearly moved, and thus a hydraulic pressure can be generated.

The motor bearing part 21 is installed between the fixing part 22 and the motor rotating part 26, and reduces friction generated during rotation of the motor rotating part 26. The rotor 28 made up of a plurality of magnets and installed in a circumferential direction of the rotary frame 27 is rotated by a change in the magnetic force of the stator 24 along with the rotary frame 27.

A cover member 29 fixed to the fixing frame 23 is installed to surround an end of the rotary frame 27, and thus prevents entry of foreign materials.

The screw 30 may be formed in various shapes without departing from the technical spirit that the screw 30 is rotatably installed inside the motor 20 and is supplied and rotated with the rotation power of the motor 20. The screw 30 according to an embodiment includes a screw body 32 that is rotatably installed inside the rotary frame 27 provided in the motor 20, has screw threads formed on an outer surface thereof, and is connected with a ball member 72, and a screw rotary shaft 34 that extends from the screw body 32 or the ball member 72 and is splined to the rotary frame 27 of the motor 20.

The screw rotary shaft 34 extending outward from the center of rotation of the screw body 32 has a smaller diameter than the screw body 32. As illustrated in FIG. 4, since a plurality of male splines 35 protrude from an outer surface of the screw rotary shaft 34 opposite to the rotary frame 27, the rotary frame 27 and the screw 30 are splined for power transmission. The screw body 32 is rotated about the ball member 72, and is subjected to axis alignment.

Further, a compensation gap 40 is provided between the rotary frame 27 and the screw rotary shaft 34. That is, the male splines 35 provided on the screw 30 and the rotary frame 27 are spaced at a preset interval, forming the compensation gap 40. Thus, a degree of freedom in which the screw 30 and a compensator 70 are movable in a vertical direction is secured. For this reason, when the master cylinder 1 of a brake for a vehicle is assembled, coaxiality among the housing 10, the screw 30, and the motor 20 can be compensated for.

As illustrated in FIG. 1, the movable piston 50 may be formed in various shapes without departing from the technical spirit that the movable piston 50 is engaged with the outside of the screw 30 and is moved in the longitudinal direction D of the housing 10 by rotation of the screw 30. The movable piston 50 according to an embodiment includes a movable body 52, the piston member 54, and a seal member 56.

The movable body 52 is installed to surround the outside of the screw body 32, and is linearly moved by rotation of the screw body 32. One side of the movable body 52 is located inside the motor rotating part 26, and the other side of the movable body 52 is located inside the housing 10.

The piston member 54 is connected to the movable body 52 extending inside the housing 10, and causes oil between the housing 10 and an immovable piston 60 to move toward the port 12. The piston member 54 is formed in a ring shape, and is fixed to the other end of the movable body 52. The piston member 54 and the movable body 52 may be integrally formed, and the piston member 54 and the movable body 52 may be separately manufactured and then assembled.

In a case where the piston member 54 and the movable body 52 are integrally formed, a process of assembling the piston member 54 and the movable body 52 is removed, and an axial length of the master cylinder 1 of a brake for a vehicle is reduced. Thus, effects such as a reduction in the number of components, a reduction in the number of assembly processes, system packaging improvement depending on a reduction in the axial length of the master cylinder 1 of a brake for a vehicle, etc. are obtained. The seal member 56 is installed on a side of the movable body 52, a side of the piston member 54, or the like, and is moved along with the movable body 52.

The immovable piston 60 may be formed in various shapes without departing from the technical spirit that the immovable piston 60 is fixed inside the housing 10 and the movable piston 50 is located outside the immovable piston 60. The immovable piston 60 according to an embodiment is located on the same axis as the screw 30. One side of the immovable piston 60 is located inside the movable piston 50, and the other side of the immovable piston 60 is fixed to the housing 10. The immovable piston 60 according to an embodiment has a cylindrical shape, and the centers of rotation of the immovable piston 60, the screw 30, and the motor rotating part 26 are coaxially located.

The compensator 70 may be formed in various shapes without departing from the technical spirit that the compensator 70 is located inside the rotary frame 27 and compensates for coaxiality of the rotary frame 27 and the screw 30. The compensator 70 according to an embodiment includes the ball member 72 and supports 74.

The ball member 72 is connected to the screw rotary shaft 34 of the screw 30 located inside the rotary frame 27, and has a curved surface. The supports 74 are located on opposite sides of the ball member 72, and rotatably support the ball member 72. The supports 74 according to an embodiment include a first support member 76 which is located inside the rotary frame 27 and through which the screw rotary shaft 34 passes, and a second support member 78 that is installed at a position opposite to the first support member 76.

The ball member 72 may have any one of a hemispherical shape and a spherical shape, and variously shaped members each having a curved surface in addition to these shapes may be used as the ball member 72. At least two portions of the ball member 72 are supported by the supports 74. The opposite sides of the ball member 72 according to an embodiment are supported by the first support member 76 and the second support member 78.

The first support member 76 is located between the ball member 72 and the male splines 35, and is installed in contact with an inner side of the rotary frame 27 opposite to the ball member 72. Since the first support member 76 opposite to the ball member 72 has a recess, the first support member 76 can rotatably support the ball member 72 along with the second support member 78.

Further, the first support member 76 can be fixedly installed on the inner side of the rotary frame 27 opposite to the ball member 72. Alternatively, the first support member 76 may be variously modified and may, for instance, be installed to face the inner side of the rotary frame 27 opposite to the ball member 72, without being fixed to the inner side of the rotary frame 27.

The second support member 78 is installed at a position opposite to the first support member 76 with the ball member 72 in-between, and is rotatably installed by a thrust bearing 110. Since a recess is also formed in the second support member 78 opposite to the ball member 72, the second support member 78 can rotatably support the ball member 72 along with the first support member 76. The first and second support members 76 and 78 according to an embodiment can be rotated along with the screw rotary shaft 34.

The second support member 78 may be fixedly installed on a side of the thrust bearing 110. Alternatively, the second support member 78 may be variously modified any may, for instance, be installed to face the side of the thrust bearing 110, without being fixed to the side of the thrust bearing 110.

The pressurizer 80 is installed on the housing 10 opposite to the guide 90, pressurizes the guide 90 with an elastic force, and imparts a preload to the guide 90. The pressurizer 80 according to an embodiment is a leaf spring having a curved cross section, and pressurizes the guide 90 in a direction in which the first support member 76 is installed. Since the pressurizer 80 pressurizes the guide 90 in a direction away from the movable piston 50, the pressurizer 80 can apply a preload during assembly of components. Thus, components located in the longitudinal direction D of the pressurizer 80 always receive a load in the same direction (in the right direction of FIG. 1).

Meanwhile, at least two portions of the ball member 72 are supported by the supports 74, and at least one portion of the ball member 72 which is in contact with the supports 74 has a curved surface. Since the ball member 72 has an alignment structure in which the ball member 72 is located between the first support member 76 and the second support member 78, a load transmitted to the ball member 72 from the pressurizer 80 is reduced, such that the work of aligning and assembling components can be easily carried out. The ball member 72 may be variously modified and may, for instance, have a spherical shape or a hemispherical shape.

The pressurizer 80 is installed on a sidewall of the housing 10 opposite to the guide 90, and elastically pressurizes the guide 90 toward one side of the housing 10 (the right side of FIG. 1).

A wave washer may be used as the pressurizer 80 made of a leaf spring. The pressurizer 80 may be modified in various shapes and may, for instance, be made of an elastic member having a wavy cross section as needed. The wave washer, also referred to as a wave spring, is a washer in which functions of a plain washer and a spring washer are combined, and serves to prevent loosening and disperse a surface pressure. Further, a rubber O-ring may be used as the pressurizer 80. The pressurizer 80 may be variously modified, and a member including at least one of silicone, a synthetic resin, and rubber may also be used as the pressurizer 80.

The guide 90 is caught on the housing 10 so that rotation thereof is restrained, and is installed to be movable in the longitudinal direction D of the housing 10. Further, the guide 90 may be formed in various shapes without departing from the technical spirit that the guide 90 restrains the rotation of the movable piston 50 and guides the linear motion of the movable piston 50 in the longitudinal direction D. The guide 90 according to an embodiment includes a guide body 92, a wing member 94, and an insertion protrusion 96.

The guide body 92 has a groove for movement of the wing member 94 in the longitudinal direction D in a state in which the wing member 94 is inserted into the groove. The guide body 92 is located outside the movable piston 50, and the insertion protrusion 96 extending from the guide body 92 is installed with being inserted in the housing 10. Further, since the insertion protrusion 96 is installed at a position opposite to the pressurizer 80, the insertion protrusion 96 is pushed against the pressurizer 80, and is pressurized to the other side of the housing 10.

The guide body 92 and the insertion protrusion 96 are integrally formed. Further, since the guide body 92 and the insertion protrusion 96 are inserted in the housing 10 without being fixed to the housing 10 so that only rotations thereof are restrained, the guide body 92 and the insertion protrusion 96 are installed to be movable inside the housing 10 in a left-right horizontal direction. Thus, the insertion protrusion 96 and the guide body 92 are pressurized in one direction (the right direction of FIG. 1) by the pressurizer 80, and receive a preload.

The wing member 94 is fixed outside the movable body 52, and is moved along with the movable body 52 in a shape protruding outside the movable body 52. One side of the wing member 94 is fixed to the movable body 52, and the other side of the wing member 94 is inserted inside the guide body 92.

When the screw 30 is rotated, rotation of the wing member 94 fixed to the movable body 52 of the movable piston 50 is restrained by the guide body 92. Accordingly, the movable body 52 is linearly moved, and serves to position the piston member 54.

That is, to implement the braking pressure required by a driver, the motor 20 rotates the screw 30, and thus the movable body 52 is linearly moved to position the piston member 54. Thus, a magnitude of the braking pressure of the master cylinder 1 of a brake for a vehicle is controlled, the seal member 56, the immovable piston 60, and the housing 10 that are assembled to components seal a space in which the braking pressure is formed.

Meanwhile, the thrust bearing 110 is installed between the second support member 78 and the guide 90, and functions to reduce a friction generated during rotation of the second support member 78.

Hereinafter, operation states of the master cylinder 1 of a brake for a vehicle according to the embodiment of the present disclosure will be described in detail with reference to the attached drawings.

If a magnetic force of the stator 24 is changed to implement the braking pressure required by the driver, the motor rotating part 26 is rotated along with the rotor 28. The motor rotating part 26 rotates the splined screw 30, and the movable piston 50 is linearly moved in the longitudinal direction D of the housing 10 due to the rotation of the screw 30.

In addition to the connecting structure in which the screw rotary shaft 34 is splined to the rotary frame 27, the screw rotary shaft 34 may be connected to the rotary frame 27 by connection of a power transmission member. Various connecting members including gear, key, and coupler connection by which the screw rotary shaft 34 is connected to the rotary frame 27 may be used as the power transmission member.

Since the wing member 94 protruding outside the movable piston 50 is inserted in the guide body 92 and the rotation thereof is restrained by the guide body 92, only linear motion of the movable piston 50 opposite to the screw 30 is allowed.

A braking pressure is formed by the movement of the movable piston 50 having the piston member 54, and oil forming the braking pressure flows through the ports 12.

The master cylinder 1 of a brake for a vehicle having this configuration is configured to be able to compensate for axis alignment among a central axis of the motor 20, a central axis of the screw 30, and a central axis of the movable piston 50. When the compensation of the axis alignment among the central axes of the components is required, the components are rotated about the ball member 72 as illustrated in FIG. 2, such that a deviation angle between assembled components can be compensated for. Since the screw 30 is moved in an up-down direction as illustrated in FIG. 3, eccentricity can also be compensated for.

Further, preloads of the components assembled between the pressurizer 80 and the first support member 76 can be controlled through the pressurizer 80 and the guide body 92 that is a slidable structure. Since values of the preloads can be controlled through the pressurizer 80 that is an elastic body, a reduction in tolerance between the assembled components and a degree of freedom of design can be obtained, and examination and effective control of design values for the deviation angle and eccentricity compensation can be performed.

Meanwhile, a first support surface B1 of the guide 90 which receives a load due to the pressurizer 80 and a hydraulic pressure inside the housing 10 has a larger area than a second support surface B2 of the movable piston 50 which receives a load due to a hydraulic pressure inside the housing 10. The guide 90 having the first support surface B1 is characterized by receiving a load in a direction (the right direction of FIG. 1) away from the movable piston 50 at all times.

As illustrated in FIG. 5, in a state in which a first valve 102 connected to the port 12 provided on one side of the housing 10 is opened and a second valve 104 connected to the port 12 provided on the other side of the housing 10 is closed, a hydraulic pressure is formed on only the other side of the piston member 54 (the left side of FIG. 5), and is transmitted to a wheel brake 100.

In this case, a pressure formed by the hydraulic pressure is transmitted in the order of the piston member 54, the movable body 52, the screw body 32, the ball member 72, and the first support member 76, thereby forming a first force F1. A force caused by the elastic force of the pressurizer 80 is transmitted in the order of the insertion protrusion 96, the guide body 92, the thrust bearing 110, the ball member 72, and the first support member 76, thereby forming a second force F2. Thus, the components are mutually brought into close contact by the first force F1 and the second force F2, thereby preventing noises or vibrations from occurring due to tolerances of the components.

As illustrated in FIG. 6, in a state in which the first valve 102 connected to the port 12 provided on one side of the housing 10 is opened and the second valve 104 connected to the port 12 provided on the other side of the housing 10 is also opened, hydraulic pressures are formed on both sides of the piston member 54, and are transmitted to the wheel brake 100.

A pressure formed by the hydraulic pressure in a chamber located on the other side of the piston member 54 (the left side of FIG. 6) is transmitted in the order of the piston member 54, the movable body 52, the screw body 32, the ball member 72, and the first support member 76, thereby forming a first force F1. A force caused by the elastic force of the pressurizer 80 is transmitted in the order of the insertion protrusion 96, the guide body 92, the thrust bearing 110, the ball member 72, and the first support member 76, thereby forming a second force F2. The hydraulic pressure in a chamber located on one side of the piston member 54 (the right side of FIG. 6) forms a third force F3 that pressurizes the guide body 92 in one direction.

Thus, the components are mutually brought into close contact by the first force F1, the second force F2, and the third force F3, thereby preventing noises or vibrations from occurring due to tolerances of the components.

As illustrated in FIG. 7, in a state in which the first valve 102 connected to the port 12 provided on one side of the housing 10 is closed and the second valve 104 connected to the port 12 provided on the other side of the housing 10 is opened, a hydraulic pressure is formed on only one side of the piston member 54 (the right side of FIG. 7), and is transmitted to the wheel brake 100.

In this case, a pressure formed by the hydraulic pressure forms a first force F1 that forcibly moves the piston member 54 to the other side of the housing 10 (the left side of FIG. 7), and a force caused by the elastic force of the pressurizer 80 is transmitted in the order of the insertion protrusion 96, the guide body 92, the thrust bearing 110, the ball member 72, and the first support member 76, thereby forming a second force F2 that pressurizes the guide body 92 to one side of the housing 10.

The hydraulic pressure in the chamber located on one side of the piston member 54 (the right side of FIG. 7) forms a third force F3 that pressurizes the guide 90 to the other side of the housing 10 (the right side of FIG. 7). Since a final force Ftot supplied to the components located between the pressurizer 80 and the first support member 76 is a positive value obtained by subtracting the first force F1 from the sum of the second force F2 and the third force F3, a fixed force is transmitted in a direction from the pressurizer 80 toward the first support member 76. Thus, the components are mutually brought into close contact by the preloads, thereby preventing noises or vibrations from occurring due to tolerances of the components.

That is, the master cylinder 1 of a brake for a vehicle according to the present disclosure is configured such that a unidirectional load is applied to the assembled components even if hydraulic pressure distribution inside both the chambers on the basis of the seal member 56 of the piston member 54 is variously changed.

Further, a gap generated by wear of the component when the master cylinder 1 of a brake for a vehicle is used can be continuously compensated for by the pressurizer 80. Further, a degree of freedom of design and durability of the pressurizer 80 applying a preload can be secured even through a structure in which an axial load caused by hydraulic pressures in the chambers of the housing 10 is not applied to the pressurizer 80.

Meanwhile, the screw rotary shaft 34 of the screw 30 can compensate for the position of the screw 30 to allow the center of rotation of the motor rotating part 26 to be coaxial with the immovable piston 60. Since the structure is provided in which the active axis alignment compensation between the components is possible due to the rotatable ball member 72 and the compensation gap 40 during an operation of the master cylinder 1 of a brake for a vehicle, system efficiency can be improved.

Further, as illustrated in FIG. 1, since a sealing area sealed by the guide 90 is larger than that sealed by the piston member 54, a structure is provided in which a load can occur toward the right side of the piston member 54 even if a hydraulic pressure is present on the right side of the piston member 54.

That is, a first sealing length A that is a length between an outer surface of the movable body 52 and an inner wall surface of the housing 10 is proportional to the sealing area sealed by the piston member 54, and a second sealing length B that is a distance from the outer surface of the movable body 52 to an outer surface of the guide 90 is proportional to the sealing area sealed by the guide 90. The second sealing length B is formed longer than the first sealing length A.

Thus, even if a hydraulic pressure is present on the right side of the piston member 54, the hydraulic pressure can be further applied toward the guide 90, having the sealing area proportional to the second sealing length B, than the piston member 54 having the sealing area proportional to the first sealing length A.

Further, the guide 90 is floated without being press-fitted and fixed into another structure, and serves to uniformly generate a load in one direction.

As described above, according to the present disclosure, since the pressurizer 80 that is the elastic body elastically pressurizes the guide body 92 in a direction in which the supports 74 are installed and imparts the preload between the assembled components, tolerance control can be facilitated, and occurrence of friction and interference between the components can be reduced. The system efficiency can be improved through preload control between the components during the operation of the master cylinder 1 of a brake for a vehicle. Further, the efficiency of active axis alignment compensation between the power transmission shafts can be improved. Further, the tolerance of the component can be reduced to increase the degree of freedom of design. Further, an durability performance can be improved and operation noises can be reduced, under preload operation conditions. Further, the concentricity and perpendicularity of the movable piston 50 and the screw 30 located on the same axis as the central axis of rotation of the motor rotating part 26 can be compensated for by the ball member 72 and the compensation gap 40, thereby improving operation reliability.

Further, since the guide 90 has a larger area receiving a load than the movable piston 50, the guide 90 always receives a load in a direction away from the movable piston 50, such that tolerance control between the components can be facilitated. Further, since the screw 30 is rotated about the ball member 72, the axis alignment can be facilitated.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A master cylinder of a brake for a vehicle comprising:
    a housing provided with ports through which oil flows;
    a motor connected to the housing and configured to supply rotation power;
    a screw rotatably installed inside the motor and supplied and rotated with the rotation power of the motor;
    a movable piston engaged with an outside of the screw and moved in a longitudinal direction of the housing by the rotation of the screw; and
    a guide caught on the housing, subjected to restraint of rotation, installed to be movable in the longitudinal direction of the housing, configured to restrain rotation of the movable piston, and configured to guide linear motion of the movable piston in the longitudinal direction,
    wherein a first support surface of the guide which receives a load due to a pressurizer configured to pressurize the guide and a hydraulic pressure inside the housing has a larger area than a second support surface of the movable piston which receives a load due to a hydraulic pressure inside the housing, and
    the pressurizer is disposed on the first support surface.

2. The master cylinder of the brake for the vehicle according to claim 1, further comprising a ball member connected to a screw rotary shaft of the screw and having a curved surface.

3. The master cylinder of the brake for the vehicle according to claim 2, further comprising supports located on both sides of the ball member and configured to rotatably support the ball member.

4. The master cylinder of the brake for the vehicle according to claim 2, wherein the screw comprises:
    a screw body rotatably installed inside the motor, having screw threads formed on an outer surface thereof, and connected with the ball member; and
    the screw rotary shaft extending from the ball member and splined to a rotary frame of the motor.

5. The master cylinder of the brake for the vehicle according to claim 4, wherein the screw body is rotated with the ball member, and is subjected to axis alignment.

6. The master cylinder of the brake for the vehicle according to claim 1, wherein the pressurizer is installed on the housing opposite to the guide and is configured to pressurize the guide with an elastic force.

7. The master cylinder of the brake for the vehicle according to claim 6, wherein the pressurizer is a leaf spring having a curved cross section, and pressurizes the guide in a direction away from the movable piston.

8. The master cylinder of the brake for the vehicle according to claim 6, wherein the guide located in a longitudinal direction of the pressurizer receives a load in the same direction.

9. The master cylinder of the brake for the vehicle according to claim 1, wherein the guide having the first support surface receives a load in a direction away from the movable piston.

* * * * *